United States Patent [19]
Henriksson

[11] Patent Number: 5,539,790
[45] Date of Patent: Jul. 23, 1996

[54] STRAINER DEVICE FOR FILTERING WATER TO AN EMERGENCY COOLING SYSTEM IN A NUCLEAR POWER PLANT

[75] Inventor: Mats Henriksson, Alvkarleby, Sweden

[73] Assignee: Vattenfall Utveckling AB, Alvkarleby, Sweden

[21] Appl. No.: 273,980

[22] Filed: Jul. 12, 1994

[30] Foreign Application Priority Data

May 20, 1994 [SE] Sweden .................. 9401770

[51] Int. Cl.⁶ .................................. G21C 19/32
[52] U.S. Cl. .......................... 376/313; 210/411
[58] Field of Search ........................ 376/313, 316, 376/299, 282; 210/408–411, 108, 106

[56] References Cited

U.S. PATENT DOCUMENTS

| | | | |
|---|---|---|---|
| 647,682 | 4/1900 | Reed | 210/409 |
| 1,260,241 | 3/1918 | Minton | 210/411 |
| 4,405,466 | 9/1983 | Giannelli et al. | 210/411 |
| 4,552,669 | 11/1985 | Sekellick | 210/410 |
| 4,631,726 | 12/1986 | Keith et al. | 210/411 |
| 5,013,457 | 5/1991 | Mims | 210/411 |
| 5,024,771 | 6/1991 | Chiarito | 210/409 |
| 5,374,351 | 12/1994 | Bolton et al. | 210/411 |

FOREIGN PATENT DOCUMENTS

| | | |
|---|---|---|
| 0481391A2 | 4/1992 | European Pat. Off. . |
| 0546308A1 | 6/1993 | European Pat. Off. . |
| 0599816A1 | 6/1994 | European Pat. Off. . |

*Primary Examiner*—Daniel D. Wasil

[57] ABSTRACT

A strainer device for filtering water to an emergency cooling system in a nuclear power plant includes a housing or tube having a perforated or apertured strainer wall through which water may flow from the outside and into the interior of the housing in connection with the regular filtration of water taken in. A water-receiving accumulator tank is connected to the cavity of the strainer housing and a source of pressurized gas is connected to the tank in order, if required, to feed pressurized gas into the tank so as to momentarily force water out therefrom and into the cavity of the strainer housing while backflushing the same.

4 Claims, 3 Drawing Sheets

STRAINER DEVICE FOR FILTERING WATER TO AN EMERGENCY COOLING SYSTEM IN A NUCLEAR POWER PLANT

TECHNICAL FIELD OF THE INVENTION

This invention relates to a strainer device for filtering liquid. More particularly, this invention relates to a strainer device for filtering water for an emergency cooling system in a nuclear reaction system.

BACKGROUND OF THE INVENTION

Such nuclear reaction systems in a typical power plant configuration include a reactor arranged in a containment zone, the lower part of which forms a pool for water. A strainer device is normally used in the pool and serves to filter water which, if required, is taken from the pool and supplied to nozzles used in the emergency cooling system in order to cool a reactor core in the event of an unacceptable temperature rise.

In general terms, the strainer device includes a housing or tube with a cavity, and one 1 or more perforated or apertured strainer walls through which water can flow from outside of the unit into the chamber or cavity of the housing. Suitable means are connected to the strainer housing for providing flush water to the interior of the housing in order to backflush or clean the strainer wall, if required. This is achieved by passing the flush water from the inside of the unit to its outside and thus removing any filtrate deposited on the outside of the strainer wall.

PRIOR ART

Known means for backflushing or backwashing strainer housings in water straining devices of the type referred to above have been based on the use of pumps. In such cases, pure flushwater may be pumped through more or less coarse conduits or pipes into the interior when a fiber or filtrate deposit on the housing outside is to be removed.

A disadvantage using pumps is that a backflushing operation can take a long period of time to carry out. This is particularly true when fiber deposits on the outside of the housing form an annular, continuous mat which can only be removed with significant difficulties from the outside of the strainer housing. A further disadvantage is that the pumping process normally calls for relatively coarse conduits, and hence expensive cost and space requirements are encountered in order to provide an acceptable water flow for backflushing use. Such coarse or heavy conduits are particularly undesirable when they have to be passed through a reactor containment zone which confines a water pool where the strainer housing is mounted.

SUMMARY OF THE INVENTION

The present invention, has for one object, overcoming the above disadvantages of known strainer devices of the type referred to above. Thus, according to one feature of the present invention, there is provided a device having an improved structure with the perforated strainer housing which may be extremely quickly and easily backflushed. A still further feature of the present invention is to provide a device which only requires simple conduits of relatively thin dimensions.

According to the present invention, there is provided an apparatus comprising a strainer device for filtering water for an emergency cooling system of a nuclear power plant having a reactor in a containment zone in which the lower part of the containment zone forms a pool for retaining water, and wherein the strainer device is located in said pool of water and is adapted to filter water. The strainer device has a housing with a cavity or chamber, and a perforated or apertured strainer wall through which water is adapted to flow from the outside thereof into said cavity. The strainer device has means associated therewith for supplying flushwater to the interior of the housing. In accordance with the invention, the improvement is provided which comprise water receiving accumulator means associated with said cavity of said strainer housing, means for connecting a source of pressurized gas to said accumulator means for feeding pressurized gas to said accumulator means, said pressurized gas when released being adapted to permit water in said accumulator tank to escape and flow to said cavity of said strainer housing to thereby clean said strainer wall.

Preferred embodiments of the invention include a strainer device of the above type, wherein the accumulator means is an accumulator tank directly connected to the strainer housing, and wherein said accumulator tank and the strainer housing are mountable in the water of said containment zone, said accumulator tank having at least one inlet to permit water to fill the tank from water surrounding the tank in a pool of water in said containment zone.

In a still further embodiment, this strainer device includes an accumulator tank which is connected to the source of pressurized gas through a conduit, said conduit including closure means, said conduit being adapted to extend through a containment wall of said containment zone.

In another preferred embodiment, the above strainer device has a strainer housing provided with at least one exterior wing whereby any deposited material on the exterior of the housing is divided into at least two separated portions whereby removal of the deposited material is facilitated upon backflushing.

In yet still another embodiment, the above strainer device includes rotation-generating means mountable in an area between said accumulator tank and the strainer housing adapted to impart a rotary motion to water entering the housing from said accumulator tank.

DETAILED DESCRIPTION OF THE PREFERRED EMBODIMENTS

Figure 1:
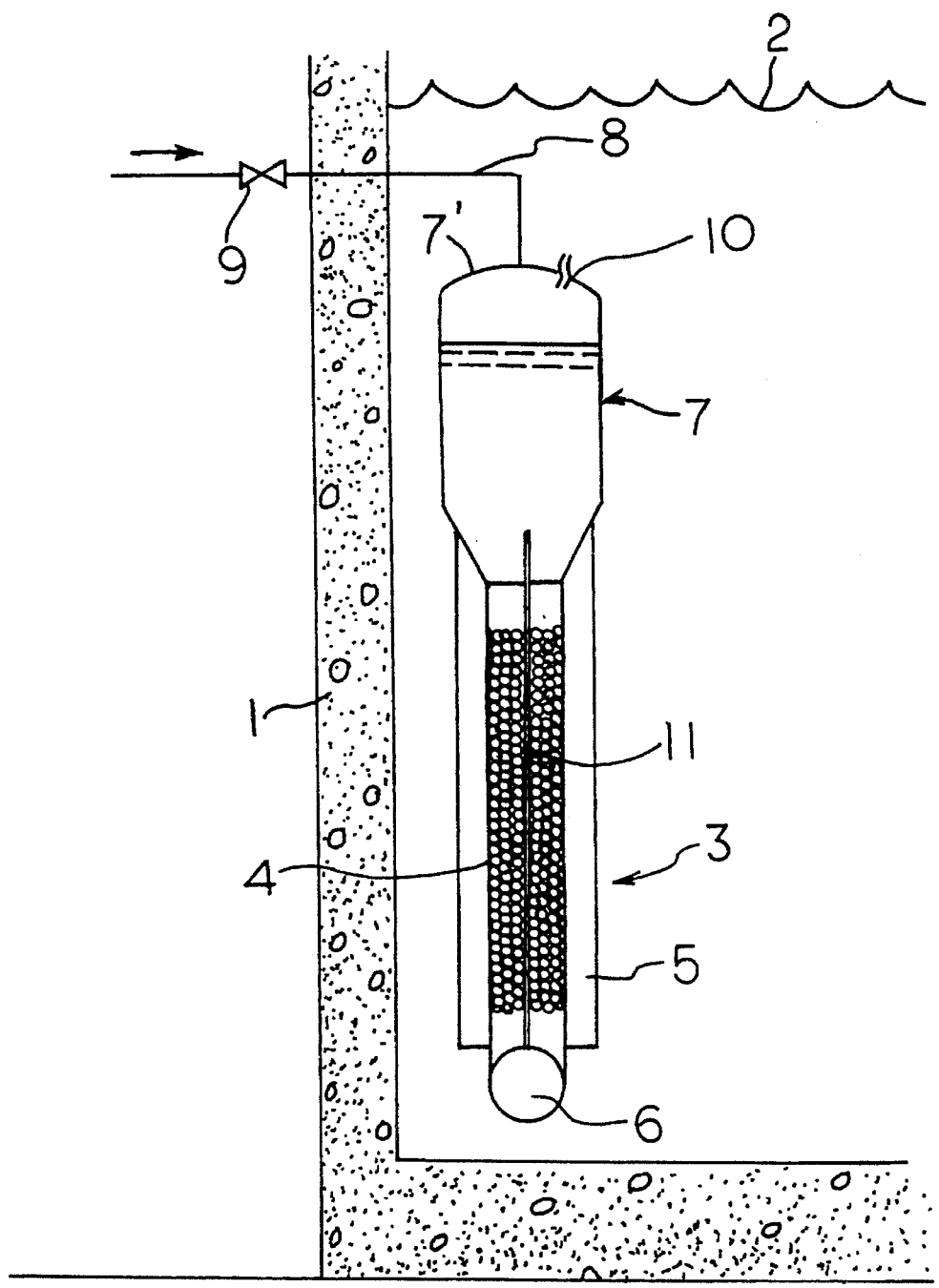
FIG. 1 is a schematic sectional view illustrating one embodiment of the invention in which an accumulator tank is situated within a reactor containment zone.

Referring to FIG. 1, reference 1 generally designates a wall which, in practice, is of a cylindrical form and which outlines a containment zone for a typical nuclear reactor (not shown) included in a nuclear power plant. The wall may be composed of a very thick, reinforced concrete wall, as well as a leakproof lining of stainless steel which is applied to the inside of the wall. The bottom part of the containment zone forms an area for a pool or basin of water—the surface of which is indicated by reference 2. At a level below the water surface, a plurality of strainer devices are mounted, one such device being indicated by reference 3. A main component of such a device is the housing or tube 4 which is provided with a perforated mantle wall, the perforations or apertures being indicated by reference number 11. The wall 4 is provided on its exterior a plurality of radially projecting wings or flanges 5 mounted thereon.

In the embodiment shown in FIG. 1, each individual strainer housing or tube 4 is connected to a lower suction conduit 6. The latter may be connected in common to a plurality of such housings. Housing 4 is mounted by suitable means (not shown) relatively closely to the inside of the containment wall 1.

Water from the lower level of the containment pool can be drawn or taken into the interior cavity or chamber of the housing and thereafter can be transported through a suction conduit to an emergency cooling system, the latter typically involving nozzles, sprinklers or the like mounted near or at the upper portion of the containment zone. Thus, when required, the reactor core can be provided with sprinkled water via such a system.

The above-described structure and its outlined features, to this point, represents a conventional system. According to the present invention, however, the strainer housing or tube 4 is connected to an accumulator tank or container 7, for holding and storing water. The tank 7 is connected, as schematically shown via line 8, to a source of pressurized gas (not shown), with the line 8 including a valve 9. In this manner, a pressurized gaseous fluid can be fed into the tank 7 in order to momentarily release or eject water into the cavity of the strainer housing 4. Typically, conduit 8 may be a relatively thin pipeline mounting the on/off valve 9. As shown in FIG. 1, pipe or conduit 8 passes through the concrete wall 1 forming the containment area, while the source of pressurized gas is located outside of the containment wall. The pressurized gas source may be any suitable conventional type; for example, a simple gas bottle or a compressor with a suitable gas storage zone may be employed for this purpose. A typical gaseous fluid which may be used includes e.g. nitrogen, although other gases such atmospheric air can also be used.

Reference number 10 designates an aperture in the wall of the container 7, the latter of which may be typically made from e.g. metal plate. Preferably, the aperture 10 is provided in the upper area or top 7' of the tank. In order to prevent large volumes of gas from escaping in a relatively short period of time, aperture 10 will have a relatively small diameter such as 1 to 5 mm (suitably 2 to 3 mm). Thus, with such measurements, it will only be possible to slowly release gas from the tank over longer periods of time for a given volume of gas. It will be understood that although one aperture 10 has been illustrated for the sake of simplicity, it will be understood that two or more apertures may be used in practice.

The operation of the strainer device in FIG. 1 can be described as follows: under normal conditions, the tank 7 is filled with water from the surrounding pool of water in the containment zone. Water to the emergency cooling system can be sucked into the interior of the strainer housing and can be transmitted or forwarded to the nozzles or sprinklers of the emergency system through the suction conduit 6. Under such conditions, the valve 9 in the gas conduit line 8 would be in a closed condition.

After a period of time where water passes through the apertures or holes 11 of the housing 4, there is a risk that the apertures may be clogged or plugged due to the fact that fibres or other foreign material may accumulate on the exterior of the housing wall and form a mat of such material or fibres. When that occurs, backflushing of the unit is required and typically this is performed by opening the valve 9 so that the pressurized gas can flow into the tank 7 and release or expel water from the tank into the interior of the cavity or chamber of the strainer housing 4.

In the above manner, water inside the strainer housing 4 will flow outwardly through the perforations 11 of the mantle wall thus removing the covering fiber mat. This fiber mat removal is highly facilitated by the presence of the radially projecting wings 5, which divide the mat into sections, each of which can thus be easily released from the wall exterior. This backflushing operation, can in its entirety, be carried out in the space of a few seconds, since the pressurized gas rapidly empties from the tank 7 and forces the water into housing 4 and out through the apertures of the strainer wall. For this reason, it will be seen that it is not necessary to interrupt the regular operation of the pump, which normally draws water into the conduit 6.

Once the backflushing operation has been completed, the cut-off valve 9 is closed so that the tank 7 is refilled with water from the pool. This automatic refilling is carried out through the aperture(s) 10 in the top of the tank, which allows the evacuation of remaining gas from the tank. In other words, water from the strainer housing may flow slowly upwardly into the tank at the same time as the gas is successively evacuated through apertures 10.

Figure 2:
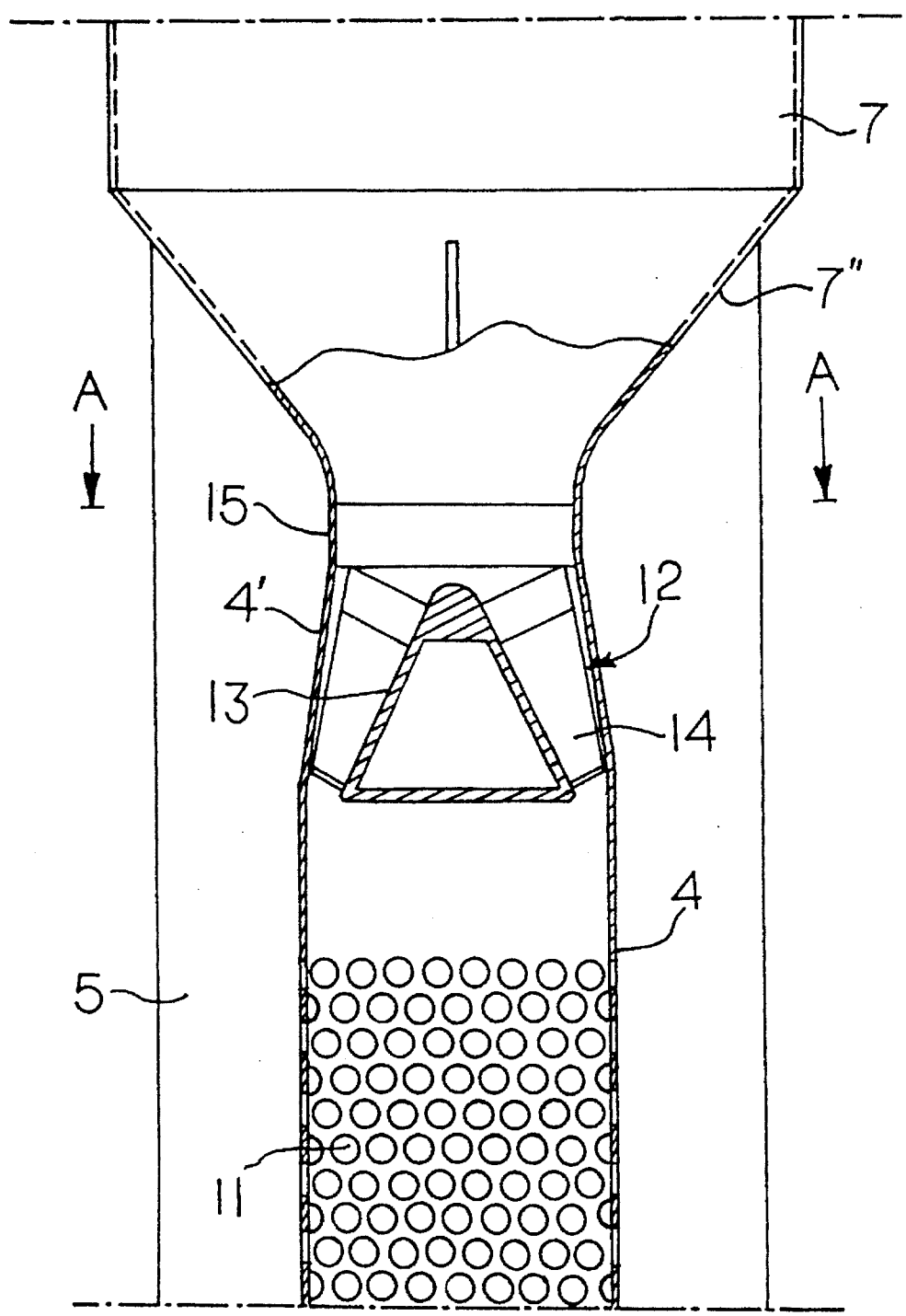
FIG. 2 is an enlarged section showing a rotation-generating means in the area between the accumulator tank and a strainer housing.
Figure 3:
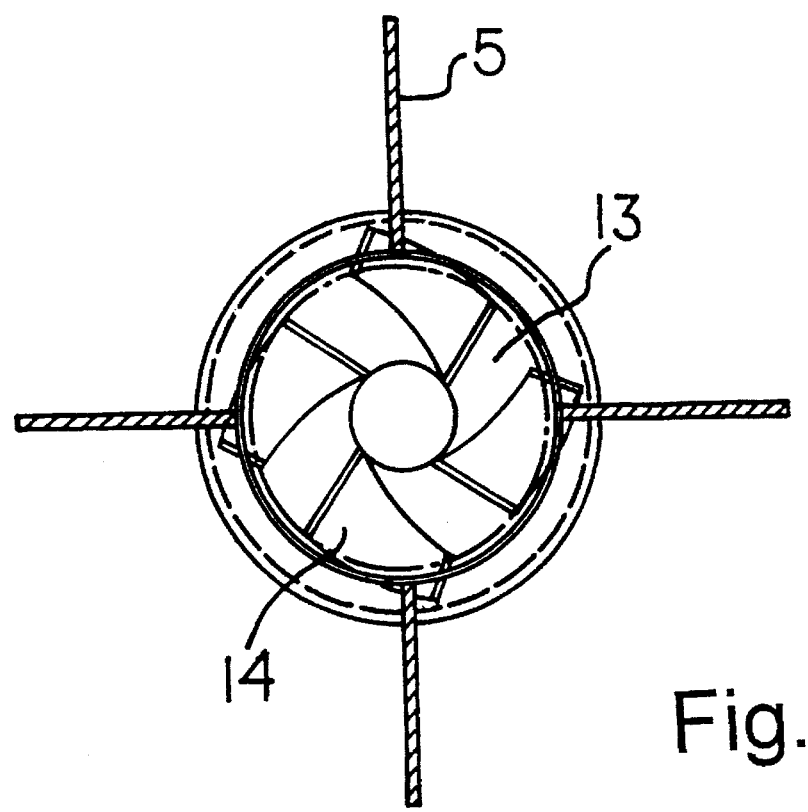
FIG. 3 is a horizontal section taken along the line A—A of FIG. 2.
Figure 4:
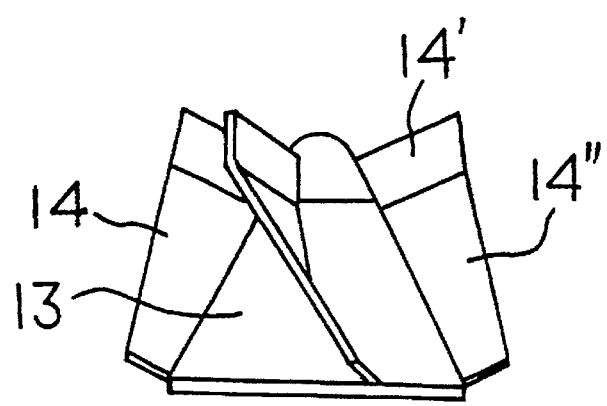
FIG. 4 is a side view of the rotation-generating means.

In a preferred embodiment illustrated in FIGS. 2 through 4, a rotation-generating means 12 is provided in the area between tank 7 and strainer housing or tube 4. The rotation-generating means 12 may include a conical-shaped body 13, which is arranged centrally in tube 4, and a plurality of curved blades 14 affixed on the outside of body 13. As indicated in FIG. 4, the top portion 14' of each blade 14 is planar and extends in parallel to the axial water flow from tank 7 to housing 4, while the remaining main portion 14" below portion 14' is curved and extends at an angle relative to portion 14'. It should also be noted that the embodiment of FIG. 2 is modified in comparison with the embodiment of FIG. 1 insofar as a tube portion 15 connecting housing tube 4 with the conical bottom portion 7" of accumulator tank 7 has a reduced diameter as compared with tube 4. This reduced portion 15 passes into another conical portion 4' surrounding body 13 at the top of tube 4. Water passing through the annular space between the outside of conical body 13 and the inside of tube portion 4' will be set into a rotary and axial motion. The result is that the water, when entering tube 4, has a tendency to be dispersed evenly on the inside of the tube. It will be noted that there is a certain distance between the bottom part of body 13 and the upper holes in the set of holes 11 in the tube wall. Accordingly, the rotating water will be evenly distributed when reaching the holes so as to secure a strong even outflow of water through the holes.

From the above description, the advantages of the invention will be obvious. Due to the fact that the backflushing can be carried out during an extremely short period of time, the regular suction of water into the conduit 6 does not have to be interrupted. Furthermore, the necessary piping in the form of the gas pipeline 8 can be made with very thin dimensions (compared with the heavy water conduit 6). This facilitates the drawing of pipeline 8 through the containment wall 7.

Within the scope of the invention it is also conceivable to place the accumulator or storage tank 7 outside the reactor containment zone and connect the same with the strainer housing via suitable conduits.

I claim:

1. In a strainer device for filtering water for use in an emergency cooling system of a nuclear power plant having a reactor in a containment zone in which the lower part of the containment zone forms a pool for retaining water, and wherein the strainer device is to be located and submerged in said pool of water and is adapted to filter water, said strainer device having a housing with a cavity or chamber, and a perforated or apertured strainer wall through which water is adapted to flow from the outside thereof into said cavity, said strainer device having means associated therewith for connecting flushwater to the interior of the housing, the improvement comprising accumulator means for containing water and being associated with said cavity of said strainer housing and means for connecting a source of pressurized gas to said accumulator means and for feeding pressurized gas to said accumulator means, said pressurized gas when released into said accumulator means being adapted to cause water in said accumulator means to escape and flow to said cavity of said strainer housing to thereby clean said strainer wall, and wherein said accumulator means is an accumulator tank directly connected to said strainer housing, and wherein said accumulator tank and said strainer housing are submersible in the water pool of said containment zone, said accumulator tank having at least one permanent aperture open to said pool water and selected to release gas slowly and to permit water to fill said tank automatically from water surrounding said tank in a pool of water in said containment zone.

2. A strainer device according to claim 1, wherein said accumulator is connected to said source of pressurized gas through a conduit, said conduit including closure means, said conduit being adapted to extend through a containment wall of said containment zone.

3. A strainer device according to claim 1, wherein the strainer housing is provided with at least one exterior wing whereby any deposited material on the exterior of said housing is divided into at least two separated portions whereby removal of said deposited material is facilitated upon backflushing.

4. A strainer device according to claim 1, wherein said device includes rotation-generating means mountable in an area between said accumulator tank and said strainer housing adapted to impart a rotary motion to water entering said housing from said accumulator tank.

* * * * *